United States Patent [19]
Price

[11] 3,973,335
[45] Aug. 10, 1976

[54] APPARATUS TO DEMONSTRATE AIR FLOW THROUGH PERMEABLE SHEET MATERIAL

[76] Inventor: Raymond C. Price, 756 S. Jason St., Denver, Colo. 80223

[22] Filed: July 24, 1975

[21] Appl. No.: 598,706

[52] U.S. Cl. .......................................... 35/49; 35/10
[51] Int. Cl.² ...................................... G09B 25/00
[58] Field of Search .................. 35/13, 49, 55, 19 R

[56] References Cited
UNITED STATES PATENTS

| | | | |
|---|---|---|---|
| 2,228,371 | 1/1941 | Shaw | 35/13 |
| 2,613,454 | 10/1952 | White | 35/13 |
| 2,897,604 | 8/1959 | Scott | 35/13 |
| 2,930,147 | 3/1960 | Martinec | 35/49 |

*Primary Examiner* — Harland S. Skogquist

[57] ABSTRACT

An apparatus to demonstrate air flow through sheet material such as carpeting and padding to provide a qualitative, visual test of the permeability of the material. A transparent, closed container is connected with a vacuum pump to pull air thereinto from an opening at the bottom of the container which is traversed and closed by a sample of the sheet material to be tested. Thus, air flows into the container by passing through the sheet material. Lightweight objects within the container are agitated by air movement and the manner and intensity with which they are bounced and tossed within the container provides for a spectacular, qualitative demonstration of the permeability of the material. Also, a simple comparison of one material with another is possible with the apparatus.

9 Claims, 6 Drawing Figures

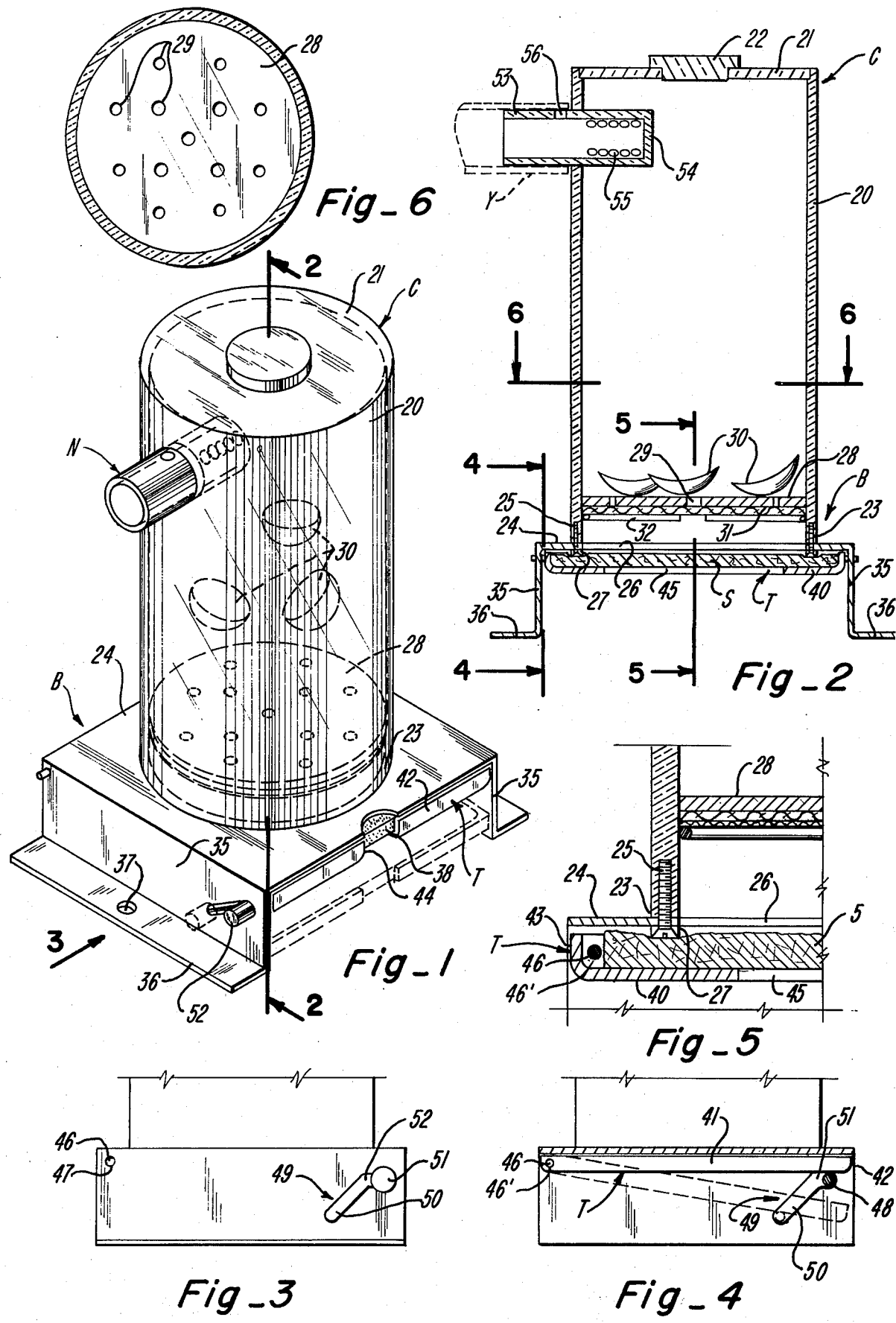

APPARATUS TO DEMONSTRATE AIR FLOW THROUGH PERMEABLE SHEET MATERIAL

This invention relates to apparatus to indicate the air-permeability of porous sheet materials, and more particularly to apparatus which will visually demonstrate such permeability by light-weight objects being agitated by air flow through the material.

In the present invention, air flows through a sheet of porous permeable material and into a closed container. This air flow is indicated by the agitation and movement of lightweight objects within the container. An important use of the present invention is to demonstrate and compare the air-permeability of various types of carpet pads or underlays. Thus, the invention will be described in connection with its being used for carpet pads but it is to be understood that the invention can also be used for all sorts of permeable sheet materials without significantly changing its basic structure.

The importance of providing a permeable carpet underlay is best appreciated when it is realized that a vacuum cleaner should pull air not only through the carpet but also through the pad underneath the carpet to remove dust and dirt particles from the carpet. Ideally, the air flow will be directly through that portion of the carpet and the pad underneath the head of the vacuum cleaner; however, often a pad may be so impervious that an air flow through it is not possible. The air flow into the vacuum cleaner is then from the top of the carpet fibers at the edges of the vacuum cleaner head picking up only a limited amount of dust and dirt from the rug, and little of the dust and dirt lying on carpet backing.

Thus, the preferred carpet pad is necessarily quite porous to permit it to be effectively cleaned with a vacuum cleaner. However, this is not always recognized and different types of carpet pads will vary considerably and drastically in their relative permeability. Some types of pads are so impervious to air flow that dust particles lying upon the carpet backing can rarely be picked up by a vacuum cleaner. Then the carpet must be cleaned in other ways, which requires them to be removed from the floor.

It follows that there is a real and definite need for a device which can demonstrate the comparative permeability of different types of carpet pads in such a manner as to permit the buyers to better exercise their discretion and judgment in making a proper purchase. The present invention was conceived and developed with the above considerations in view and comprises, in essence, an apparatus to demonstrate the comparative air permeability of carpet pads, but permitting air to flow through samples of different types of pads and into a closed transparent container wherein lightweight objects, such as pingpong balls or small plastic foam objects will be disturbed by this air flow to bounce around in the container with an intensity which is proportional to the velocity of the air flow. With this apparatus it is possible to quickly and dramatically show the differences in permeability between different types of carpet pads, even though superficial examination of the different pads may not show any significant difference in this respect.

It follows that a primary object of the invention is to provide a novel and improved apparatus to demonstrate the permeability of various carpet pads and the manner in which a vacuum cleaner can pick up dust when a permeable pad is used and thus assist buyers in selecting a good type of pad.

Another object of the invention is to provide, in an apparatus which will demonstrate air flow through different types of porous carpet pads, an arrangement to permit specimens of different pads to be quickly and easily placed in the apparatus, tested and then removed.

Another object of the invention is to provide a novel and improved apparatus to demonstrate air flow through a permeable carpet pad which is especially attractive to a customer, small enough to be located anywhere in a store and easily moved from one location to another.

Another object of the invention is to provide a novel and improved apparatus to demonstrate that permeable pads, such as pads consisting of an open pore plastic foam material, will be much easier to keep clean than pads of impermeable material.

Other objects of the invention are to provide an apparatus to demonstrate air flow through carpet pads which is simple, economical, reliable, versatile and capable of being used for long periods of time without maintenance problems.

With the foregoing and other objects in view, my present invention comprises certain constructions, combinations and arrangements of parts and elements as hereinafter described, defined in the appended claims and illustrated in preferred embodiment by the accompanying drawing in which:

FIG. 1 is an isometric view of a preferred embodiment of the apparatus to demonstrate air flow through a permeable carpet pad, with lightweight objects within the container shown as being lifted by an air flow through the apparatus, and with dotted lines indicating the position which a specimen tray at the base of the unit will assume when it is opened for changing a specimen, a small square of carpet pad.

FIG. 2 is a transverse sectional elevation view of the apparatus shown at FIG. 1, with a specimen in place for demonstration, as taken from the indicated line 2—2 at FIG. 1.

FIG. 3 is a fragmentary side elevation view as taken substantially from the indicated arrow 3 at FIG. 1.

FIG. 4 is a fragmentary sectional detail as taken from the indicated line 4—4 at FIG. 2, and with dotted lines indicating the position the specimen tray will assume when it is opened.

FIG. 5 is a fragmentary sectional detail as taken from the indicated line 5—5 at FIG. 2 by an enlarged scale.

FIG. 6 is a fragmentary sectional detail as taken from the indicated line 6—6 at FIG. 2.

Referring more particularly to the drawing, the demonstrator apparatus is formed as an upright, transparent cylinder C mounted upon a square base B wherein a specimen tray T is fitted as hereinafter described. A nipple N is located near the top of the cylinder to connect with the line of vacuum pump, not shown. The unit may be of any suitable proportions. For example, one unit was constructed wherein the cylinder was approximately 5½ inches in diameter and 10 inches tall, mounted upon a base 7 inches square and 2 inches high; however such dimensions are not at all critical and the unit may be smaller or it may be as much as twice as large as such indicated dimensions.

The cylinder C is formed of a selected, transparent material such as an acrylic plastic with the cylinder wall 20 being closed at the top by a lid 21 having a central access orifice wherein a plug 22 may be fitted. The bottom of the cylinder is open and the bottom edge 23 of this cylindrical wall 20 is fitted on to the top of a flat, substantially square plate, the top plate 24 of the base B. This is a permanent connection made with machine screws 25 as hereinafter further described. The bottom of the cylinder overlies an orifice 26 in the top plate 24 having the same inside diameter as the cylinder 20, having spacer ring 27, having essentially the same inside and outside diameter as the cylinder 20, and is placed at the undersurface of this base plate 24 about the orifice 25. The flathead machine screws 25 extend about this cylinder-plate-ring assembly in a regular array, and through countersunk holes in the ring 27, clearance holes in the plate 24 and into tapped holes in the cylinder 20, as best illustrated at FIG. 5. The connections may be otherwise if made in accordance with proper shop practice.

This opening below the cylinder 20, at the spacer ring 27, will be traversed and closed by a specimen S, a carpet pad. The specimen S is carried in the tray T and its top edge will contact the bottom edge of the ring 27 to form closure at the bottom of the cylinder 20. Accordingly, whenever a carpet pad is in place, and a vacuum is formed in the cylinder, air will flow through the pad in all directions and out the top of the specimen S which is within the embrace of the spacer ring 27, then into the cylinder.

A circular floor plate 28, is fitted into the cylinder 20 a short distance above the bottom edge 23 of the cylinder and a scattered array of orifices 29 extends through this plate as best shown at FIG. 6. These orifices permit air jets to flow into the body of the cylinder to disturb small plastic foam objects 30 which will be lifted and tumbled by jets of air flowing through these orifices. This plate is preferably of transparent plastic material such as an acrylic and thus it may be solvent welded to the inside wall of the cylinder. The orifices 29 are distributed over the plate 28 in any suitable manner as to produce upward air jets at all portions of the plate to disturb and disrupt the foam objects 30 regardless of where they may be located.

A carpet will ordinarily be quite permeable and will not impede an air flow through the apparatus, and thus to provide for an effective demonstration a circular carpet pad 31 may be placed at the underside of this plate 28 and held in place by a snap ring 32. With the carpet 31 and the specimen pad S in place, the air flow through the apparatus, as indicated by the movement of the foam objects 30, will be indicative of the permeability of both the pad and the carpet.

To form the base B, sidewalls 35 depend from each side of the top plate 24, leaving the front and rear ends of the base open to receive the tray T and provide space for easy air flow to the underside of the tray. Each sidewall includes an outstanding bottom flange 36 with an orifice 37 therein to facilitate affixing the unit to a table or like surface if desired. This base, that is the top plate 24, the side walls 35 and the flanges 36, is formed as a matter of convenience, of a folded moderately heavy piece sheet metal. With the orifice 26 cut in the top plate 24, suitable clearance orifices are drilled about the orifice 26 to receive the machine screws 25, as are the orifices 37 and other orifices and slots in the side walls 35.

The tray is a square, flat pan-shaped member having a floor 40 side walls 41, front wall 42 and a back wall 43. These walls are not very high, being in the order of approximately ¼-inch and merely sufficient to hold a pad specimen S in place. A notch 44 is located at the center of the front wall to extend a short distance into the floor 40 to match the notch 38 on the plate 24 as heretofore described. A circular opening 45 having a diameter approaching the inside diameter of the cylinder 20 is centered in the floor 40 of the tray to allow free movement of air from the bottom of the tray through the specimen and into the cylinder.

This flat tray T is positioned at the underside of the top plate 24 so that a pad specimen S will bear against the underside of the spacer ring 27 as heretofore described. It is desired to permit this tray to swing downwardly from a position directly underneath the top plate 24 for insertion or removal of a pad specimen to or from a specimen tray. Accordingly, the tray is conveniently carried upon a transverse pivot rod 46 near the back wall 43 to extend through orifices 46, the side walls 41 of the tray with each end of the rod 46 extending therebeyond and through orifices 47 in the side wall 24 of the base B. This permits the front wall 42 to be swung downwardly for easy access to the specimen pad as in the manner indicated in dotted lines at FIGS. 1 and 4. Various suitable modes can be devised for holding the front end of the tray upwardly and against the underside of the top plate 24 and a preferred latch for accomplishing this consists of a transverse rod 48 which extends underneath the floor of the tray and through sloping slots 49 at the front end of each side wall 35. The slots are essentially bayonet-type slots having a main portion 50 angling downwardly and offsets 51 at the top portion of slots to latch the rod 48 in place underneath the tray to hold the specimen in the tray against the underside of the spacer ring, as best illustrated at FIG. 4. Each end of the rod 48 which projects along the side wall 48 may be finished by cylindrical 51 grippers, of rubber or plastic material covering the rod ends illustrated in FIG. 3.

To complete the apparatus the nipple N is formed as a cylindrical pipe 53 extending through the cylinder wall 20 near the top of the unit and it is contemplated that this pipe 53 will be made of a transparent acrylic and that it will be solvent welded into place in the cylinder. A portion of this pipe extends outwardly from the cylinder and a line from a vacuum pump will fit over this portion. Another portion of this pipe 53 will extend inwardly into a cylinder 20 and the end thereof will be closed by a cap 54. To permit air inflow from the cylinder 20 and into a pipe 53 a series of holes 55 will be cut into the pipe at different angular positions, such as straddling the vertical and horizontal centerlines of the pipe as illustrated. The purpose of such an arrangement of holes 55 for intake of air is to prevent a vortex within the cylinder 20 which might cause one or more of the foam objects 30 to move upwardly and lodge against this pipe 53. To complete the unit, a supplementary hole 56 is provided at the outer position 53 at the top and can be used to demonstrate to an observer the intensity within the container 20. If it becomes desirable not to use this hole 56, it is contemplated that the vacuum line which connects with the pipe 53 can be pushed on to this pipe until it covers the hole 56.

Operation of the unit above-described is simple and straightforward. A vacuum line y indicated in dotted lines at FIG. 2 is fitted onto the nipple N. A pad specimen S is fitted into the tray T and the tray is pushed upwardly against the underside of the spacer ring 27.

The air flow through the apparatus is first through the specimen pad S, thence through the carpet 31, thence through the orifices 29 of the floor plate 28 and finally out the pipe 53. This air flow will disrupt the foam objects 30, and the extent to which the objects are agitated will provide a good indication of the permeability of the pad specimen. To vary the demonstration it is possible to place a cardboard sheet or a similar impermeable sheet between the specimen pad and the tray. Any air flow which then passes through the specimen pad S will come into the specimen from the top and the sides of the specimen and thence into the spacer ring 27. It is contemplated that a carpet pad specimen S made of a good quality open-pore foam material will be permeable to air flow either directly through the underside and top of the pad and through the sides of the pad when an impermeable sheet is placed between the pad and the floor of the tray.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. A permeability demonstrator comprising:
   a. base means;
   b. hollow vacuum housing means mounted on said base means including outlet means for drawing air from said housing means, and inlet means from said base means to said housing means;
   c. perforate means in said housing for supporting air entrainable indicators;
   d. means for supporting a sample of material for a permeability demonstration in said base means; and
   e. seal means at said inlet means for said housing means to provide a seal between said housing means and a held sample.

2. A permeability demonstrator according to claim 1, wherein said vacuum housing means is transparent.

3. A permeability demonstrator according to claim 1 wherein said outlet means includes a plurality of small bores for withdrawing air from said housing means.

4. A permeability demonstrator according to claim 1 wherein said outlet includes at least one exterior bore for introducing exterior air to vacuum means connected to said outlet means.

5. A permeability demonstrator according to claim 1 wherein said means for supporting a sample includes releasable support means for holding a sample against said seal means.

6. A permeability demonstrator according to claim 5 wherein said releasable support means includes a tray means having one side hinged so as to permit the opposite side to drop for removal or replacement of a sample.

7. A permeability demonstrator according to claim 1 wherein said means for supporting a sample includes an air inlet therethrough.

8. A permeability demonstrator according to claim 1 wherein said perforate means includes air openings therethrough spaced substantially through the extent of cross-section thereof providing air flow throughout the cross-section of said vacuum housing means.

9. A permeability demonstrator according to claim 1 being further characterized by carpet sample support means below said perforate means and above said means for supporting a sample.

* * * * *